(12) United States Patent
Praisner et al.

(10) Patent No.: US 9,212,558 B2
(45) Date of Patent: Dec. 15, 2015

(54) ENDWALL CONTOURING

(71) Applicant: United Technologies Corporation, Hartford, CT (US)

(72) Inventors: Thomas J. Praisner, Colchester, CT (US); Andrew S. Aggarwala, Vernon, CT (US); Eric A. Grover, Tolland, CT (US); Renee J. Jurek, Colchester, CT (US)

(73) Assignee: United Technologies Corporation, Hartford, CT (US)

(*) Notice: Subject to any disclaimer, the term of this patent is extended or adjusted under 35 U.S.C. 154(b) by 522 days.

(21) Appl. No.: 13/663,977

(22) Filed: Oct. 30, 2012

(65) Prior Publication Data

US 2014/0090401 A1    Apr. 3, 2014

Related U.S. Application Data

(60) Provisional application No. 61/706,994, filed on Sep. 28, 2012.

(51) Int. Cl.
*F01D 9/00* (2006.01)
*F02C 3/04* (2006.01)
*F01D 5/14* (2006.01)

(52) U.S. Cl.
CPC ............... *F01D 5/145* (2013.01); *F01D 5/143* (2013.01); *F05D 2240/123* (2013.01); *F05D 2240/305* (2013.01); *F05D 2250/712* (2013.01); *Y02T 50/673* (2013.01)

(58) Field of Classification Search
CPC ............. F01D 5/02; F01D 5/06; F01D 5/143; F01D 5/145; F05D 2240/123; F05D 2240/305; F05D 2250/712; Y02T 50/673

See application file for complete search history.

(56) References Cited

U.S. PATENT DOCUMENTS

| | | | |
|---|---|---|---|
| 2,735,612 A * | 2/1956 | Hausmann | 415/208.1 |
| 3,529,631 A | 9/1970 | Riollet | |
| 4,465,433 A | 8/1984 | Bischoff | |
| 6,283,713 B1 | 9/2001 | Harvey et al. | |
| 6,419,446 B1 * | 7/2002 | Kvasnak et al. | 415/191 |
| 6,561,761 B1 * | 5/2003 | Decker et al. | 415/173.1 |
| 6,969,232 B2 | 11/2005 | Zess et al. | |
| 7,134,842 B2 | 11/2006 | Tam et al. | |
| 7,220,100 B2 | 5/2007 | Lee et al. | |
| 7,690,890 B2 | 4/2010 | Aotsuka et al. | |
| 7,887,297 B2 | 2/2011 | Allen-Bradley et al. | |

(Continued)

OTHER PUBLICATIONS

International Search Report and Written Opinion for related International Application No. PCT/US2013/54953; report dated Apr. 22, 2014.

*Primary Examiner* — Igor Kershteyn

(74) *Attorney, Agent, or Firm* — Miller, Matthias & Hull LLP

(57) ABSTRACT

An airfoil array is disclosed. The airfoil array may include an endwall, and a plurality of airfoils radially projecting from the endwall. Each airfoil may have a first side and an opposite second side extending axially in chord between a leading edge and a trailing edge. The airfoil array may further include a convex profiled region extending from the endwall adjacent the first side of at least one of said plurality of airfoils and near the leading edge of the at least one of said plurality of airfoils. The airfoil array may further include a concave profiled region in the endwall adjacent the first side of said at least one of said plurality of airfoils and aft of the convex profiled region.

20 Claims, 3 Drawing Sheets

(56) References Cited

U.S. PATENT DOCUMENTS

| | | | |
|---|---|---|---|
| 8,992,179 B2* | 3/2015 | Stein et al. | 416/193 R |
| 2006/0153681 A1* | 7/2006 | Lee et al. | 416/97 R |
| 2007/0258818 A1 | 11/2007 | Allen-Bradley et al. | |
| 2007/0258819 A1 | 11/2007 | Allen-Bradley et al. | |
| 2008/0232968 A1 | 9/2008 | Nguyen | |
| 2010/0143139 A1 | 6/2010 | Pandey et al. | |
| 2010/0158696 A1 | 6/2010 | Pandey et al. | |
| 2010/0254797 A1 | 10/2010 | Grover et al. | |
| 2011/0044818 A1 | 2/2011 | Kuhne et al. | |
| 2012/0201688 A1 | 8/2012 | Mahle et al. | |

* cited by examiner

ENDWALL CONTOURING

CROSS-REFERENCE TO RELATED APPLICATIONS

The present disclosure claims the benefit of priority from U.S. Provisional Patent Application Ser. No. 61/706,994, filed on Sep. 28, 2012, which is incorporated herein by reference.

FIELD OF THE DISCLOSURE

The present disclosure relates generally to airfoil arrays utilized in gas turbine engines and, more particularly, to endwall contouring.

BACKGROUND OF THE DISCLOSURE

Gas turbine engines typically include a compressor section, a combustor section, and a turbine section, with an annular flow path extending axially through each. Initially, air flows through the compressor where it is compressed or pressurized. The combustor then mixes and ignites the compressed air with fuel, generating hot combustion gases. These hot combustion gases are then directed by the combustor to the turbine where power is extracted from the hot gases by causing blades of the turbine to rotate.

Some sections of the engine include airfoil arrays. Air within the engine moves through fluid flow passages in the arrays. The fluid flow passages are established by adjacent airfoils projecting from laterally extending endwalls. Near the endwalls, the fluid flow is dominated by a flow phenomenon known as a horseshoe vortex, which forms as a result of the endwall boundary layer separating from the endwall as the gas approaches the leading edges of the airfoils. The separated gas reorganizes into the horseshoe vortex. There is a high loss of efficiency associated with the vortex, and this loss is referred to as "secondary" or endwall loss. Accordingly, there exists a need for a way to mitigate or reduce endwall losses.

SUMMARY OF THE DISCLOSURE

According to one embodiment of the present disclosure, an airfoil array is disclosed. The airfoil array may comprise an endwall, and a plurality of airfoils radially projecting from the endwall. Each airfoil may have a first side and an opposite second side extending axially in chord between a leading edge and a trailing edge. The airfoil array may further comprise a convex profiled region extending from the endwall adjacent the first side of at least one of said plurality of airfoils and near the leading edge of the at least one of said plurality of airfoils. The airfoil array may further comprise a concave profiled region in the endwall adjacent the first side of said at least one of said plurality of airfoils and aft of the convex profiled region.

In a refinement, the concave profiled region may begin where the convex profiled region ends.

In another refinement, the concave profiled region may be near mid-chord of the airfoil.

In another refinement, a local maximum in radial extent of the convex profiled region may be positioned between the leading edge and mid-chord.

In another refinement, a local minimum in radial extent of the concave profiled region may be positioned near mid-chord.

In another refinement, each airfoil may have an axial chord, and a local maximum in radial extent of the convex profiled region may be disposed between about 0% to about 50% of the axial chord.

In another refinement, each airfoil has an axial chord, and a local minimum in radial extent of the concave profiled region may be disposed between about 30% to about 80% of the axial chord.

In yet another refinement, the airfoils may be circumferentially spaced apart thereby defining a plurality of flow passages between adjacent airfoils, and each flow passage has a passage width.

In a related refinement, a local maximum in radial extent of the convex profiled region is disposed between about 0% to about 50% of the passage width.

In another related refinement, a local minimum in radial extent of the concave profiled region is disposed between about 0% to about 50% of the passage width.

In another refinement, the first side may be a pressure side of an airfoil.

In yet another refinement, the opposite second side may be a suction side of an airfoil.

According to another embodiment, a gas turbine engine is disclosed. The gas turbine engine may comprise, a compressor section, a combustor section downstream of the compressor section, and a turbine section downstream of the combustor section. One of the compressor section and the turbine section may have at least one airfoil array having a plurality of airfoils circumferentially spaced apart and projecting radially from an endwall, the airfoils and endwall establishing a plurality of flow passages. Each airfoil may have a first side, an opposite second side, a leading edge, and a trailing edge. The endwall may have adjacent to the first side of at least one of said plurality of airfoils a convex profiled surface near the leading edge and a concave profiled surface aft of the convex profiled surface.

In a refinement, the convex profiled surface may gradually increase in radial height to a local maximum in radial extent from a surface of the endwall adjacent to the convex profiled surface.

In a related refinement, each airfoil may have an axial chord, and the local maximum in radial extent of the convex profiled surface may be disposed between about 0% to about 50% of the axial chord.

In a related refinement, each flow passage may have a passage width, and the local maximum in radial extent of the convex profiled surface may be disposed between about 0% to about 50% of the passage width.

In another refinement, the concave profiled surface may gradually decreases in radial height to a local minimum in radial extent from a surface of the endwall adjacent to the concave profiled surface.

In a related refinement, each airfoil may have an axial chord, and the local minimum in radial extent of the concave profiled surface may be disposed between about 30% to about 80% of the axial chord.

In a related refinement, each flow passage may have a passage width, and the local minimum in radial extent of the concave profiled surface may be disposed between about 0% to about 50% of the passage width.

In yet another refinement, the first side may be a pressure side of an airfoil and the opposite second side may be a suction side of an airfoil.

These and other aspects and features of the disclosure will become more readily apparent upon reading the following detailed description when taken in conjunction with the accompanying drawings.

While the present disclosure is susceptible to various modifications and alternative constructions, certain illustrative embodiments thereof, will be shown and described below in detail. It should be understood, however, that there is no intention to be limited to the specific embodiments disclosed, but on the contrary, the intention is to cover all modifications, alternative constructions, and equivalents along within the spirit and scope of the present disclosure.

DETAILED DESCRIPTION

Figure 1:
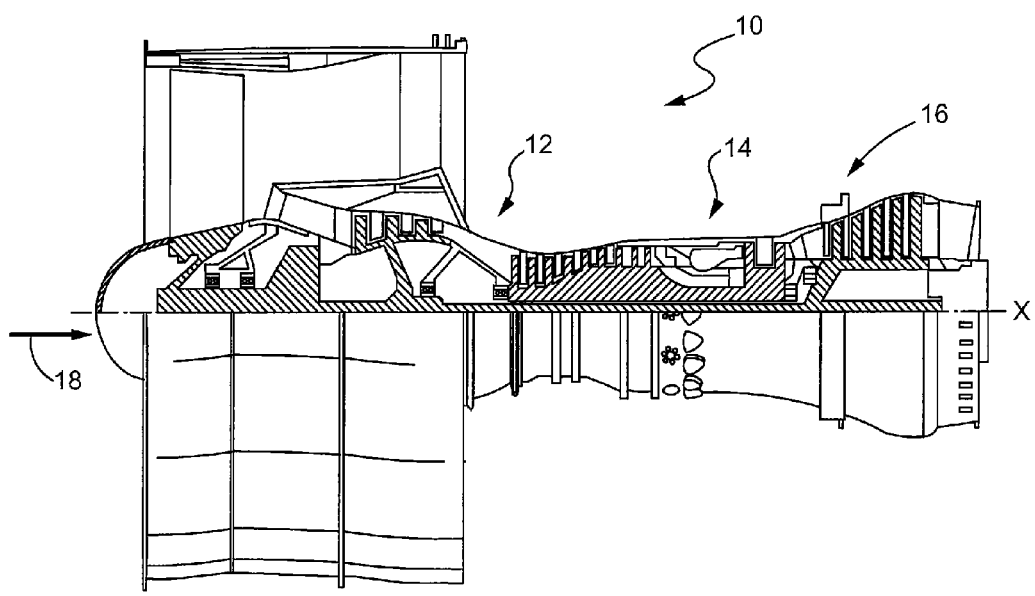
FIG. 1 is a partial sectional view of a gas turbine engine according to one embodiment of the present disclosure.

Referring now to the drawings, and with specific reference to FIG. 1, in accordance with the teachings of the disclosure, an exemplary gas turbine engine 10 is shown. The gas turbine engine 10 may generally comprise a compressor section 12 where air is pressurized, a combustor section 14 downstream of the compressor section 12 which mixes and ignites the compressed air with fuel, thereby generating hot combustion gases, a turbine section 16 downstream of the combustor section 14 for extracting power from the hot combustion gases, and an annular flow path 18 extending axially through each.

The turbine section 16 or the compressor section 12 may include at least one airfoil array 20. As shown best in FIG. 2, the airfoil array 20 may comprise a plurality of airfoils 22 projecting radially from an endwall 24. For example, the airfoils 22 may be provided as a stage of rotor blades or stator vanes in the compressor section 12 or the turbine section 16 of the gas turbine engine 10. The endwall 24 may be either an inner diameter (ID) endwall or an outer diameter (OD) endwall or both. The airfoils 22 may be circumferentially spaced apart on the endwall 24 and arranged about the engine centerline X (FIG. 1), thereby defining a plurality of fluid flow passages 26 between adjacent airfoils 22 with the endwall 24. Each airfoil 22 may have a first side 28 and an opposite second side 30 extending axially in chord between a leading edge 32 and a trailing edge 34. Fluid flow, such as airflow, moves toward the flow passages 26 from a position upstream of the leading edge 32 of the airfoils 22 as the engine 10 operates.

The endwall 24 may have a plurality of convex profiled regions 36 and a plurality of concave profiled regions 38 configured to direct flow through each of the flow passages 26 within the airfoil array 20. Illustrated in FIG. 3 with topographic contour lines, the convex profiled region 36 may be located adjacent the first side 28 of at least one of said plurality of airfoils 22 near the leading edge 32, and the concave profiled region 38 may be located adjacent the first side 28 of each airfoil 22 aft of the convex profiled region 36. Relative to a surface 40 adjacent the convex profiled region 36, the convex region 36 may extend radially inward toward the annular flow path 18.

Each airfoil 22 may have a chord 42, which is defined as a line from the leading edge 32 to the trailing edge 34, and an axial chord 44, which is a projection of the chord 42 onto a plane containing the engine centerline X. Relevant distances may be expressed as a percentage of the length of the axial chord 44, as shown in the percentage scale at the bottom of FIG. 3. Each fluid flow passage 26 may have a passage width W measured from the first side 28 of each airfoil 22 to the second side 30 of a neighboring airfoil 46. The passage width W may typically vary from a passage inlet 48 to a passage outlet 50 so that the passage width may be locally different at different chordwise locations. Relevant distances may be expressed as a fraction or percentage of the length of the passage width W, with 0% referenced at the first side 28 of each airfoil 22 and 100% referenced at the second side 30 of the neighboring airfoil 46.

From the surface 40 adjacent the convex profiled region 36, the convex region 36 may gradually increase in radial height, or move radially inward toward the annular flow path 18, to a local maximum in radial extent 52. It will be understood that the convex profiled region 36 may extend further than the illustrated contour lines. The convex profiled region 36 may have the local maximum in radial extent 52 positioned between the leading edge 32 and mid-chord of the airfoil 22. The local maximum in radial extent 52 of the convex profiled region 36 may be disposed within an inclusive axial range of about 0% to about 50% of the axial chord and may be disposed within an inclusive lateral range of about 0% to about 50% of the passage width W.

Adjacent the first side 28 of at least one of said plurality of airfoils 22, the concave profiled region 38 may generally begin where the convex profiled region 36 ends. Relative to a surface 40 adjacent the concave profiled region 38, the concave region 38 may extend radially outward away from the annular flow path 18. From the surface 40 adjacent the concave profiled region 38, the concave region 38 may gradually decrease in radial height, or move outward radially away from the annular flow path 18, to a local minimum in radial extent 54. It will be understood that the concave profiled region 38 may extend further than the illustrated contour lines. The concave profiled region 38 may have the local minimum in radial extent 54 positioned aft of the convex profiled region 36 and before the trailing edge 34. For example, the concave profiled region 38 may generally be near mid-chord of each airfoil 22 with the local minimum in radial extent 54 positioned or centered near mid-chord of the airfoil 22. The local minimum in radial extent 54 of the concave profiled region 38 may be disposed within an inclusive axial range of about 30% to about 80% of the axial chord and may be disposed within an inclusive lateral range of about 0% to about 50% of the passage width.

Figure 2:
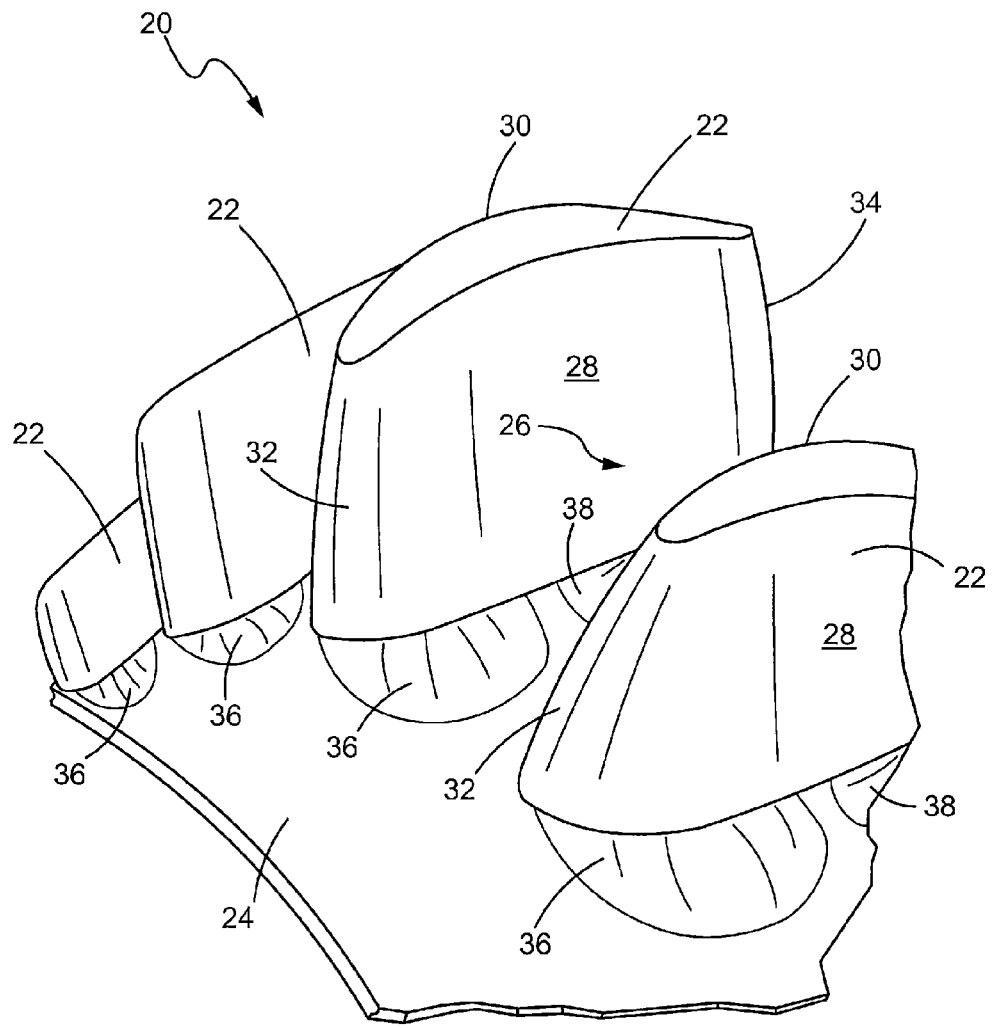
FIG. 2 is a perspective view of an airfoil array within the gas turbine engine of FIG. 1.
Figure 3:
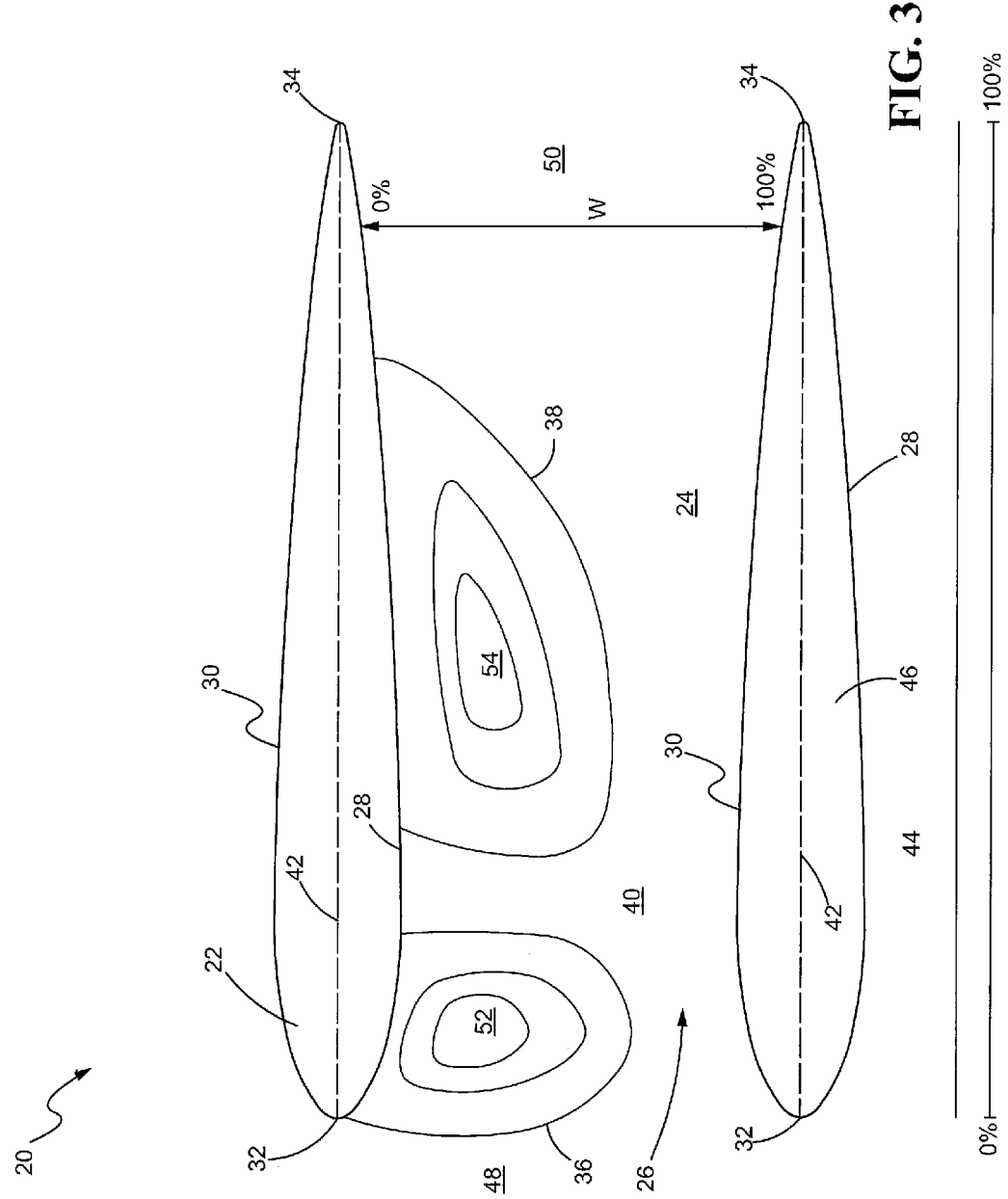
FIG. 3 is a plan view with topographic contours showing a portion of the airfoil array of FIG. 2.

It will be understood that the endwall 24 contouring described herein may be applied to any type of airfoil array 20 without departing from the scope of the invention. According to an exemplary embodiment, the contoured endwall 24 may be applied to an airfoil array 20 with airfoils 22 having a camber or turning airfoil, as shown in FIG. 2. For example, the first side 28 of each airfoil 22 may be a pressure side, the second side 30 of each airfoil 22 may be a suction side, and the convex profiled region 36 and the concave profiled region 38 may be adjacent the pressure side of the airfoil 22. According to another exemplary embodiment, the contoured endwall 24 may be applied to an airfoil array 20 with airfoils 22 having no camber, as shown in FIG. 3. Such airfoils 22 may be provided, for example, as compressor or turbine blades or vanes, or middle turbine frames in a gas turbine engine.

INDUSTRIAL APPLICABILITY

From the foregoing, it can be seen that the teachings of this disclosure can find industrial application in any number of different situations, including but not limited to, gas turbine engines. Such engines may be used, for example, on aircraft for generating thrust, or in land, marine, or aircraft applications for generating power.

The disclosure described provides a way to mitigate or reduce endwall losses in an airfoil array. By positioning a convex profiled region of the endwall adjacent the first side of the airfoils near the leading edge and a concave profiled region of the endwall elongated across the flow passages, the present invention influences flow through the flow passages, thereby reducing endwall losses due to the horseshoe vortex. Furthermore, the contoured endwall described herein results in an improved aerodynamic performance of the airfoil arrays. Such contouring may minimize aerodynamic losses through blade or vane passages of a gas turbine engine, for example, those of a first stage turbine vane. In so doing, this may decrease heat, friction and pressure losses while improving engine efficiency and life of the blade or vane.

While the foregoing detailed description has been given and provided with respect to certain specific embodiments, it is to be understood that the scope of the disclosure should not be limited to such embodiments, but that the same are provided simply for enablement and best mode purposes. The breadth and spirit of the present disclosure is broader than the embodiments specifically disclosed and encompassed within the claims appended hereto.

What is claimed is:

1. An airfoil array, comprising:
   an endwall;
   a plurality of airfoils radially projecting from the endwall, each airfoil having a first side and an opposite second side extending axially in chord between a leading edge and a trailing edge;
   a convex profiled region extending from the endwall adjacent the first side of at least one of said plurality of airfoils and near the leading edge of the at least one of said plurality of airfoils, the convex profiled region gradually increasing in radial height from the first side of said at least one of said plurality of airfoils to a local maximum in radial extent, the local maximum in radial extent being separated by a predetermined distance from the first side of said at least one of said plurality of airfoils; and
   a concave profiled region in the endwall adjacent the first side of said at least one of said plurality of airfoils and aft of the convex profiled region.

2. The airfoil array of claim 1, wherein the concave profiled region begins where the convex profiled region ends.

3. The airfoil array of claim 1, wherein the concave profiled region is near mid-chord of the airfoil.

4. The airfoil array of claim 1, wherein the local maximum in radial extent of the convex profiled region is positioned between the leading edge and mid-chord.

5. The airfoil array of claim 1, wherein a local minimum in radial extent of the concave profiled region is positioned near mid-chord.

6. The airfoil array of claim 1, wherein each airfoil has an axial chord, and a local maximum in radial extent of the convex profiled region is disposed between about 0% to about 50% of the axial chord.

7. The airfoil array of claim 1, wherein each airfoil has an axial chord, and a local minimum in radial extent of the concave profiled region is disposed between about 30% to about 80% of the axial chord.

8. The airfoil array of claim 1, wherein the airfoils are circumferentially spaced apart thereby defining a plurality of flow passages between adjacent airfoils, and each flow passage has a passage width.

9. The airfoil array of claim 8, wherein the local maximum in radial extent of the convex profiled region is disposed between about 0% to about 50% of the passage width.

10. The airfoil array of claim 8, wherein a local minimum in radial extent of the concave profiled region is disposed between about 0% to about 50% of the passage width.

11. The airfoil array of claim 1, wherein the first side is a pressure side of an airfoil.

12. The airfoil array of claim 1, wherein the opposite second side is a suction side of an airfoil.

13. A gas turbine engine, comprising:
   a compressor section;
   a combustor section downstream of the compressor section; and
   a turbine section downstream of the combustor section, one of the compressor section and the turbine section having at least one airfoil array having a plurality of airfoils circumferentially spaced apart and projecting radially from an endwall, the airfoils and endwall establishing a plurality of flow passages, each airfoil having a first side, an opposite second side, a leading edge, and a trailing edge, the endwall having adjacent to the first side of at least one of said plurality of airfoils a convex profiled surface near the leading edge and a concave profiled surface aft of the convex profiled surface, the convex profiled surface gradually increasing in radial height from the first side of said at least one of said plurality of airfoils to a local maximum in radial extent, the local maximum in radial extent being separated by a predetermined distance from the first side of said at least one of said plurality of airfoils.

14. The gas turbine engine of claim 13, wherein the convex profiled surface gradually increases in radial height to the local maximum in radial extent from a surface of the endwall adjacent to the convex profiled surface.

15. The gas turbine engine of claim 14, wherein each airfoil has an axial chord, and the local maximum in radial extent of the convex profiled surface is disposed between about 0% to about 50% of the axial chord.

16. The gas turbine engine of claim 15, wherein each flow passage has a passage width, and the local maximum in radial extent of the convex profiled surface is disposed between about 0% to about 50% of the passage width.

17. The gas turbine engine of claim 13, wherein the concave profiled surface gradually decreases in radial height to a local minimum in radial extent from a surface of the endwall adjacent to the concave profiled surface.

18. The gas turbine engine of claim 17, wherein each airfoil has an axial chord, and the local minimum in radial extent of the concave profiled surface is disposed between about 30% to about 80% of the axial chord.

19. The gas turbine engine of claim 18, wherein each flow passage has a passage width, and the local minimum in radial extent of the concave profiled surface is disposed between about 0% to about 50% of the passage width.

20. The gas turbine engine of claim 13, wherein the first side is a pressure side of an airfoil and the opposite second side is a suction side of an airfoil.

* * * * *